(12) United States Patent
Fodor et al.

(10) Patent No.: US 9,551,415 B2
(45) Date of Patent: Jan. 24, 2017

(54) OUTPUT TORQUE CONTROL METHOD

(71) Applicant: FORD GLOBAL TECHNOLOGIES, LLC, Dearborn, MI (US)

(72) Inventors: Michael Glenn Fodor, Dearborn, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 14/468,864

(22) Filed: Aug. 26, 2014

(65) Prior Publication Data

US 2016/0061319 A1    Mar. 3, 2016

(51) Int. Cl.
 *F16H 61/04* (2006.01)
 *F16H 61/688* (2006.01)

(52) U.S. Cl.
 CPC ........ *F16H 61/0437* (2013.01); *F16H 61/688* (2013.01); *B60W 2520/28* (2013.01); *F16H 2061/0462* (2013.01)

(58) Field of Classification Search
 CPC ............... F16H 61/0437; F16H 61/688; F16H 2061/0462; B60W 10/02; B60W 2510/0275; B60W 2510/104; B60W 2510/1045; B60W 2520/28; B60W 2520/10; B60W 2520/105
 See application file for complete search history.

(56) References Cited

U.S. PATENT DOCUMENTS

| | | | |
|---|---|---|---|
| 6,991,584 B2* | 1/2006 | Cowan | B60W 30/18 477/110 |
| 7,559,259 B2 | 7/2009 | Fruhwirth et al. | |
| 7,643,929 B2 | 1/2010 | Stroh | |
| 7,722,499 B2* | 5/2010 | Soliman | B60K 6/445 477/181 |
| 8,457,847 B2 | 6/2013 | Li et al. | |
| 8,494,729 B2 | 7/2013 | Li et al. | |
| 2010/0318269 A1* | 12/2010 | Yanakiev | F16H 61/061 701/55 |
| 2013/0297112 A1 | 11/2013 | Gibson et al. | |
| 2014/0274556 A1* | 9/2014 | Fujii | F16H 61/04 477/79 |
| 2014/0324308 A1* | 10/2014 | Pietron | F16D 48/06 701/68 |

* cited by examiner

*Primary Examiner* — Jacob S Scott
(74) *Attorney, Agent, or Firm* — James Dottavio; Brooks Kushman P.C.

(57) ABSTRACT

Readings of multiple sensors are utilized to estimate transmission output, which is used as a feedback signal to control the torque capacity of a transmission clutch. Some sensor readings, such as transmission output speed, are used to compute an input vector. Then, a current state vector is computed as a linear function of the previous state vector and the input vector. One of the values in the state vector is shaft twist, which is proportional to transmission output torque. Various other sensor readings, including wheel speed, are used to correct for noise. Wheel speed signals are received with a delay. To accommodate this delay, the state vector is expanded to include estimates of wheel speed at various past points in time. An accelerometer reading is used at very low speeds at which the wheel speed sensor and transmission output speed sensor are unreliable.

17 Claims, 5 Drawing Sheets

OUTPUT TORQUE CONTROL METHOD

TECHNICAL FIELD

This disclosure relates to the field of automatic transmission controls. More particularly, the disclosure pertains to estimation and control of transmission output torque.

BACKGROUND

An automatic transmission establishes various power flow paths having different speed ratios by selectively engaging and disengaging a number of shift elements. The shift elements include friction clutches. The torque capacity of each friction clutch is determined based on a signal from a transmission controller. For example, a controller may send a pulse width modulated signal to a solenoid such that the electromagnetic force exerted by the solenoid is proportional to the pulse width. The solenoid valve may be connected to a spool valve in a valve body such that the hydraulic pressure in a particular passageway of the valve body is proportional to the electromagnetic force. Fluid from the passageway may be routed to a piston apply chamber of a clutch causing the piston to exert a force related to the fluid pressure. The piston force may squeeze friction plates between separator plates to establish a torque capacity of a clutch. Alternatively, the signal may influence the torque capacity by other mechanism such as causing a motor to rotate, thus causing a piston to apply force to a clutch pack. Due to the indirect causal chain between the signal and the clutch torque capacity, a number of unpredictable noise factors may influence the relationship.

When the controller determines that a speed ratio change is needed, the controller may execute a shift by releasing one shift element called an off-going element and engaging another shift element called an on-coming element. For the shift to feel smooth to vehicle occupants, it is important that the torque capacity of the on-coming element and the torque capacity of the off-going element be coordinated with respect to one another and with respect to the engine torque. For example, if the off-going clutch is released prematurely, then the output torque will drop excessively and the engine speed will rise. This phenomenon is called an engine flare. On the other hand, if the off-going element is released too late, then the two shift elements will resist one another and the output torque will drop excessively. This phenomenon is called a tie-up.

Vehicles with certain types of transmissions, such as dual clutch transmissions (DCTs), are launched by gradually engaging a clutch. While the clutch is slipping, output torque is determined by the torque capacity of the launch clutch. The driver indicates a desired level of output torque by depressing an accelerator pedal. If the clutch is engaged too slowly, the vehicle will not accelerate as quickly as the driver desires and the engine speed may increase excessively. If the clutch is engaged too quickly, the vehicle may accelerate too rapidly and the engine speed may drop.

In order to adjust the control signals such that the torque capacities are proper in the presence of unknown noise factors, a controller may utilize a feedback signal. Since, in many circumstances, the control strategy is attempting to achieve a particular transmission output torque, an estimate of actual transmission output torque is often a valuable feedback signal. Direct measurements of transmission torque may not be available in many vehicles. Therefore, an estimate of transmission output torque derived from available sensor readings is desirable.

SUMMARY OF THE DISCLOSURE

A transmission clutch is controlled by completing a number of steps at regular intervals. These steps include computing an input vector based on various measurements, computing a current step state vector as a function of the input vector and a previous step state vector, and adjusting clutch torque capacity based on one of the state values in the state vector. The measurements may include a transmission output speed, driven and/or non-driven wheel speed, and vehicle acceleration. The state vector includes at least one value that is generally proportional to transmission output torque such as an estimate of present shaft twist angle. The state vector may also include an estimate of present wheel speed, one or more estimates of past wheel speed, and an estimate of vehicle speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
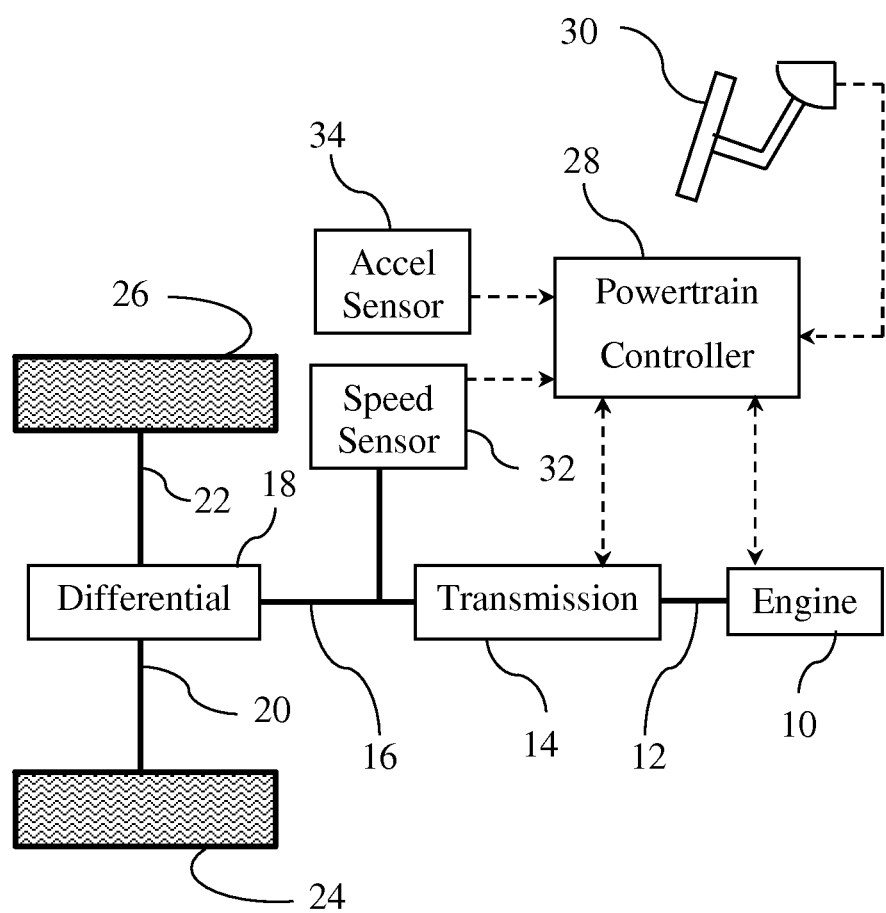
FIG. 1 is a schematic diagram of a vehicle powertrain.

FIG. 1 illustrates a vehicle adapted to adjust the torque capacity of a transmission clutch based on a torque estimate derived from multiple sensors. Mechanical connections are illustrated with solid lines while dotted lines represent signals that convey information. Power to propel the vehicle is generated by internal combustion engine 10 turning a crankshaft 12. This power is conditioned to satisfy vehicle needs by transmission 14 and delivered to driveshaft 16. In particular, when the vehicle is at low speed, transmission 14 reduces the speed and multiplies the torque relative to the power provided by the engine. When the vehicle is at high speed, transmission 14 causes driveshaft 16 to rotate faster than the engine crankshaft 12. Differential 18 divides the power from driveshaft 16 between left and right axles 20 and 22 which drive left and right driven wheels 24 and 26 respectively. Differential 18 permits the two axles to rotate at slightly different speeds relative to one another when the vehicle turns a corner. Differential 18 also multiplies the driveshaft torque by a fixed ratio called the final drive ratio and changes the axis of rotation by 90 degrees. Although FIG. 1 illustrates a rear wheel drive (RWD) vehicle with a longitudinal engine, the invention is also applicable to a front wheel drive (FWD) configuration with a transverse. In a front wheel drive configuration, the crankshaft axis is parallel to the axle axis and the transmission may convey power to the differential 18 by axis transfer gearing or a chain and sprocket arrangement as opposed to a driveshaft.

Powertrain controller 28 adjusts torque produced by the engine 10 and the speed ratio of the transmission 14. For example, controller 28 may send signals to engine 10 to control throttle opening, spark timing, and fuel injection. As discussed below, controller 28 may adjust the transmission ratio by sending signals to set the torque capacity of various clutches within transmission 14. Powertrain controller determines the drivers intended level of output torque based on the position of a driver actuated accelerator pedal 30 among other signals. As discussed in more detail below, powertrain controller 28 determines the current level of output torque base on signals from a transmission output speed sensor 32 and a longitudinal acceleration sensor 34 among other signals. Powertrain controller 28 may be implemented as a single processor or as multiple communicating processors such as an engine controller and a transmission controller. Particular functions may be implemented as hardware circuits or by software code executed by a processor.

Figure 2:
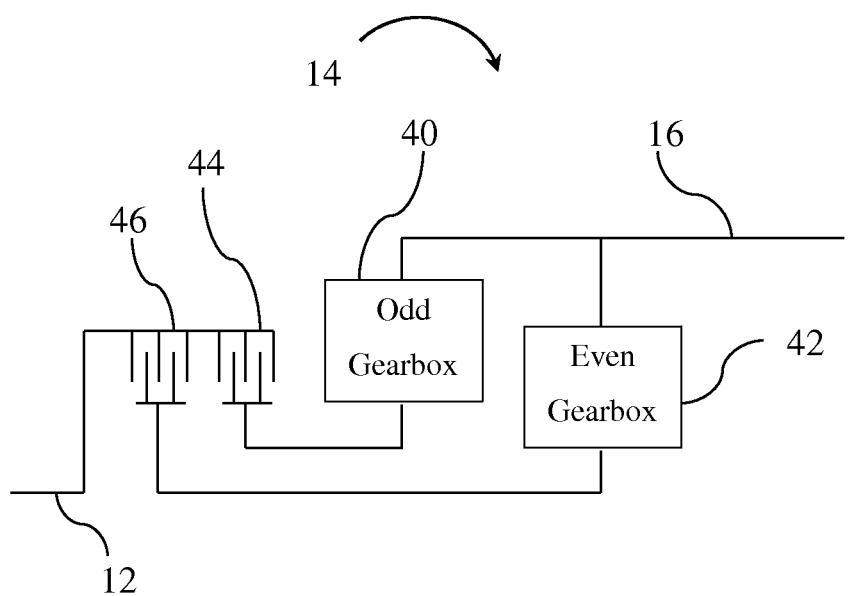
FIG. 2 is a schematic diagram of a dual clutch transmission.

Various types of transmission may be utilized, including for example a step ratio automatic transmission with planetary gearing and a torque converter, a continuously variable transmissions with a variator and a launch clutch, or an infinitely variable transmission. FIG. 2 illustrates an exemplary transmission type known as a dual clutch transmission (DCT). A DCT includes a gearbox 40 which selectively establishes the gear ratios for the odd numbered gears and another gearbox 42 that selectively establishes the gear ratios for the even numbered gears. At least one of the gearboxes 40 and 42 also selectively establishes a reverse gear ratio. Gearboxes 40 and 42 each establish gear ratios in response to signals from powertrain controller. For example, the processor may command an actuator to engage a synchronizer associated with the desired gear ratio. Gearboxes 40 and 42 may both be engaged in gear ratios at the same time. The outputs of both gearboxes 40 and 42 are fixedly coupled to driveshaft 16. Odd clutch 44 selectively couples crankshaft 12 to the input of odd gearbox 40 while even clutch 46 selectively couples crankshaft 12 to the input of even gearbox 42.

When the vehicle is stationary with forward drive selected, the controller commands the odd gearbox 40 to establish the 1st gear ratio, commands zero torque capacity for clutches 44 and 46, and commands the engine to generate just enough torque to maintain an idle engine speed. When the driver indicates a desire to move forward by depressing accelerator pedal 30, the controller increases the engine torque and increases the torque capacity of odd clutch 44. Since the input of gearbox 40 is still stationary and the crankshaft is rotating, there is slip across clutch 44. While clutch 44 is slipping, the transmission output torque is equal to the torque capacity of clutch 44 multiplied by the 1st gear ratio, subject to any parasitic losses. Controller 28 adjusts the output torque to a desired level, as indicated by accelerator pedal position, by adjusting the torque capacity of clutch 44. While clutch 44 is slipping, variations in engine torque result in changes in engine speed but not changes in transmission output torque. Specifically, if the engine torque exceeds the torque capacity of clutch 44, the engine speed increases and engine speed decreases if the engine torque is less than the torque capacity of clutch 44. Due to the transmission output torque, the vehicle gradually speeds up until the input of gearbox 40 reaches the same speed as the crankshaft. At that point, the launch is complete. When the clutch is not slipping, the transmission output torque is controlled by varying the engine torque.

To shift from 1st gear to 2nd gear, the controller commands gearbox 42 to establish 2nd gear while the vehicle is moving in 1st gear. Then, clutch 44 is gradually released while the torque capacity of clutch 46 is gradually increased. Since the input of gearbox 42 is rotating slower than the input of gearbox 40 and crankshaft 12 in this condition, clutch 46 will initially be slipping. While clutch 46 is slipping, the transmission output torque is determined by the torque capacity of clutch 46. Subsequent shifts are controlled in analogous fashion. Whenever the power is transmitted through a slipping clutch, the transmission output torque is dictated by the torque capacity of that clutch. When the transmission is established in a fixed gear ratio, the output torque is dictated by engine torque.

Figure 3:
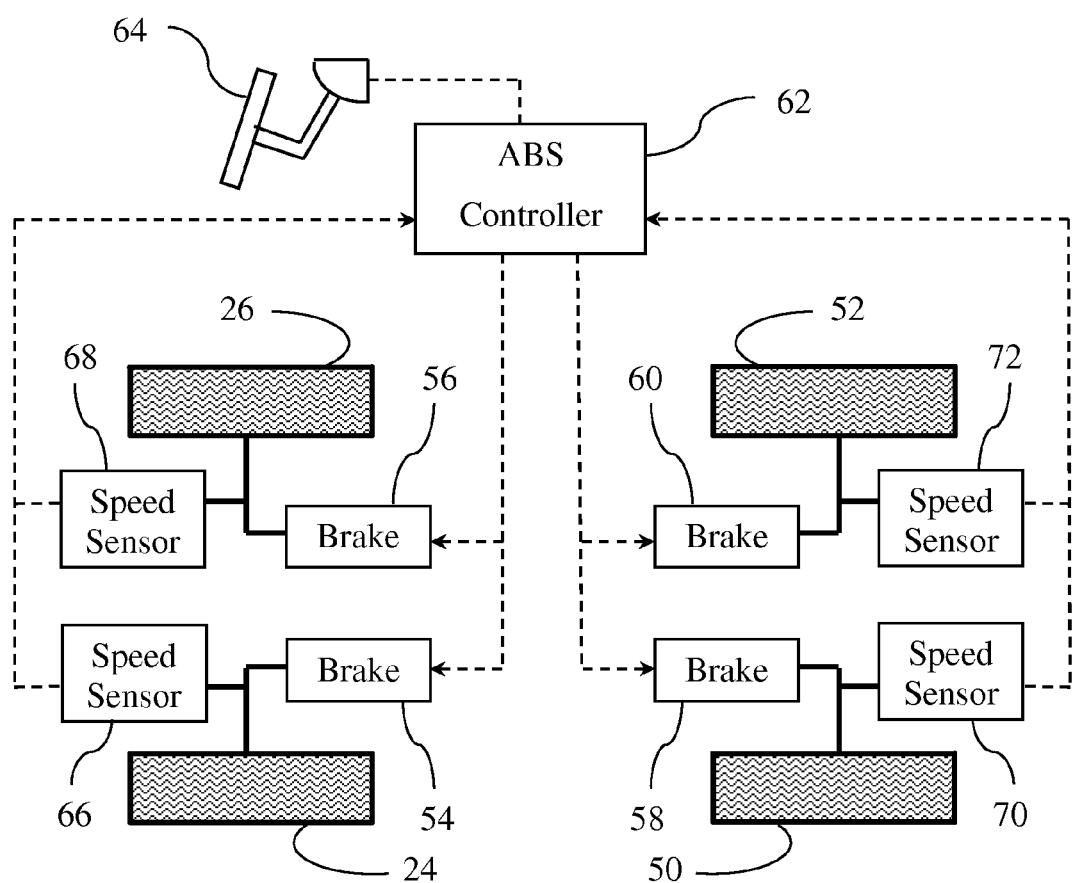
FIG. 3 is a schematic diagram of a vehicle braking system.
Figure 4:
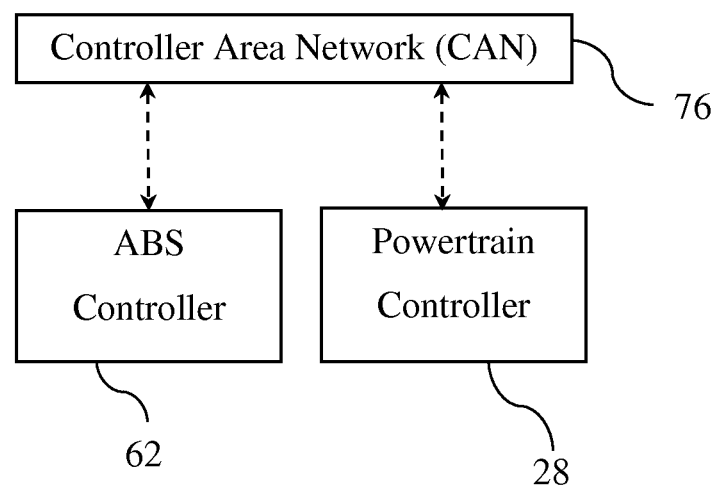
FIG. 4 is a schematic diagram of a network of controllers.

The vehicle may also be equipped with an anti-lock brake (ABS) system as shown in FIG. 3. Brakes 54 and 56 act on driven wheels 24 and 26 while brakes 58 and 60 act on non-driven wheels 50 and 52. Each brake exerts torque to slow the respective wheel in response to a command signal from ABS controller 62. Controller 62 determines the driver's desire to slow the vehicle based on the position of driver actuated brake pedal 64. Controller 62 also monitors signals from speed sensors 66, 68, 70, and 72 to determine the speeds of wheels 24, 26, 50, and 52 respectively. Differences among the speeds of the wheels may indicate loss of traction. In response, controller 62 may reduce the commanded braking torque on the corresponding wheel to regain traction and reduce stopping distance. As shown in FIG. 4, ABS controller 62, powertrain controller 28, and other controllers may communicate with one another via a controller area network (CAN) 76. A controller may periodically post information onto the CAN to make that information available to other controllers. For example, the ABS controller 62 may periodically post information about wheel speed making this information available to powertrain controller 28. However, there may be a delay between the time a measurement is taken by one controller and the time that the information becomes available to another controller.

As discussed above, powertrain controller 28 continuously calculates a target transmission output torque and manipulates signals to various actuators to deliver an output torque as close as possible to the target level. These actuators may vary the torque capacity of clutches 44 and 46. The controller may compute the desired torque capacity based on known relationships between clutch torque capacity and output torque and then send commands to the actuator based on a nominal relationship between the command and clutch torque capacity. This method of control is called open loop control. Unfortunately, various noises in the system may result in the actual clutch torque capacity not responding exactly as anticipated. Closed loop control utilizes a feedback signal, such as output torque, that varies in response to the actual clutch torque capacity. Closed loop control and open loop control may be used together by adding a closed loop term to the open loop command to the clutch actuator.

Transmission output torque can be estimated with the aid of a mathematical driveline model in the controller. The driveline can be modeled in terms of driveline twist angle, $\theta$, average driven wheel speed, $\omega_w$, and vehicle speed, $V_x$. Specifically, transmission output torque is directly proportional to driveline twist angle, $\theta$. The derivatives of these state values are given by the equations:

$$\dot{\theta} = \omega_o - \omega_w,$$

$$\dot{\omega}_w = \frac{1}{J_w}[\tau_w + k_s\theta_s + b_s(\omega_o - \omega_w) - b_t(\omega_w - V_x/r_w)],$$

and $$\dot{V}_x = \frac{1}{m_v}\left[\frac{b_t}{r_w}(\dot{\omega}_w - V_x/r_w) + F_b\right]$$

where $\omega_0$ is transmission output speed, $J_w$ is the driven wheel moment of inertia, $k_s$ and $b_s$ are driveline stiffness and damping coefficients, $b_t$ is the tire coefficient of friction, $r_w$ is the tire radius, and $m_v$ is the vehicle mass. The above equations are based on a front wheel drive powertrain in which the transmission output speed is measured after the final drive ratio. For a rear wheel drive powertrain, the transmission output speed should be multiplied by the final drive ratio and the driveshaft should be included in the driveline stiffness parameters.

These equations also require estimates of the driven wheel torque due to rolling resistance and braking, $\tau_w$, and other forces on the vehicle such as aerodynamic drag, grade forces, and braking of non-driven wheels, $F_b$. These quantities may be estimated utilizing information available via CAN from the ABS controller and from other sensors. For example, aerodynamic drag can be estimated based on vehicle speed.

The controller may operate in an interrupt driven mode in which the state values are updated at regular intervals. A discrete time version of the driveline model can be expressed in vector form as:

$$\begin{bmatrix} \hat{\theta}_{s,n+1} \\ \hat{V}_{x,n+1} \\ \hat{\omega}_{w,n+1} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} \hat{\theta}_{s,n} \\ \hat{V}_{x,n} \\ \hat{\omega}_{w,n} \end{bmatrix} + \begin{bmatrix} b_{11} & b_{12} & b_{13} \\ b_{21} & b_{22} & b_{23} \\ b_{31} & b_{32} & b_{33} \end{bmatrix} \begin{bmatrix} \omega_o \\ \tau_w \\ F_b \end{bmatrix}$$

where $\hat{X}_{n+1}$ is the estimate of state variable X at the current time step, $\hat{X}_n$ is the estimate of state variable X at the previous time step, and $a_{ij}$ and $b_{ij}$ are calibration parameters. Nominal values of these calibration parameters may be computed based on parameters of the continuous time model described above, the time step T, and a quantity D given by the formula:

$$D = \frac{T\left[b_s + Tk_s + b_t\left(\frac{m_v r_w^2}{Tb_t + m_v r_w^2}\right)\right]}{J_w} + 1.$$

Specifically, $$a_{11} = 1 - \frac{T^2 k_s}{J_w D},$$

$$a_{12} = -\frac{T}{D},$$

$$a_{13} = -\frac{T^2 b_t m_v r_w}{J_w D(Tb_t + m_v r_w^2)},$$

$$a_{21} = \frac{Tk_s}{J_w D},$$

$$a_{22} = \frac{1}{D},$$

$$a_{23} = -\frac{Tb_t m_v r_w}{J_w D(Tb_t + m_v r_w^2)},$$

$$a_{31} = -\frac{T^2 b_t k_s r_w}{J_w D(Tb_t + m_v r_w^2)},$$

$$a_{32} = -\frac{Tb_t r_w}{D(Tb_t + m_v r_w^2)},$$

$$a_{33} = \frac{m_v r_w^2}{Tb_t + m_v r_w^2} + \frac{T^2 b_t^2 m_v r_w^2}{J_w D(Tb_t + m_v r_w^2)^2},$$

$$b_{11} = T - \frac{T^2(b_s + Tk_s)}{J_w D},$$

$$b_{12} = -\frac{T^2}{J_w D},$$

$$b_{13} = -\frac{T^3 b_t r_w}{J_w D(Tb_t + m_v r_w^2)},$$

$$b_{21} = \frac{T(b_s + Tk_s)}{J_w D},$$

$$b_{22} = \frac{T}{J_w D},$$

$$b_{23} = \frac{T^2 b_t r_w}{J_w D(Tb_t + m_v r_w^2)},$$

$$b_{31} = \frac{T^2 b_t r_w(b_s + Tk_s)}{J_w D(Tb_t + m_v r_w^2)},$$

$$b_{32} = -\frac{T^2 b_t r_w}{J_w D(Tb_t + m_v r_w^2)},$$

and $$b_{33} = \frac{Tr_w^2}{Tb_t + m_v r_w^2} + \frac{T^3 b_t^2 r_w^2}{J_w D(Tb_t + m_v r_w^2)^2}.$$

The accuracy of the above model can be improved by adding additional feedback signals based on sensed quantities. Since the ABS system is already sensing the speeds of each wheel, the average driven wheel speed $\omega_w$ can be utilized to increase accuracy. Specifically, the difference between the predicted wheel speed from the previous time step and the measured wheel speed is multiplied by a calibratable constant $K_w$ and then added to the predicted wheel speed for the current time step. The value of $K_w$ is selected high enough to gradually reduce any error over a number of time steps but low enough to avoid introducing instability. Similarly, the difference may also be multiplied by calibratable constants $K_\theta$ and $K_V$ and then added to the predicted shaft twist and vehicle speed for the current time step, respectively. With the addition of wheel speed measurement, the state equation becomes:

$$\begin{bmatrix} \hat{\theta}_{s,n+1} \\ \hat{V}_{x,n+1} \\ \hat{\omega}_{w,n+1} \end{bmatrix} = \begin{bmatrix} a_{11} & a_{12} & (a_{13}-K_\theta) \\ a_{21} & a_{22} & (a_{23}-K_V) \\ a_{31} & a_{32} & (a_{33}-K_w) \end{bmatrix} \begin{bmatrix} \hat{\theta}_{s,n} \\ \hat{V}_{x,n} \\ \hat{\omega}_{w,n} \end{bmatrix} + \begin{bmatrix} b_{11} & b_{12} & b_{13} & K_\theta \\ b_{21} & b_{22} & b_{23} & K_V \\ b_{31} & b_{32} & b_{33} & K_w \end{bmatrix} \begin{bmatrix} \omega_o \\ \tau_w \\ F_b \\ \omega_w \end{bmatrix}.$$

In a similar fashion, the average non-driven wheel speed may provide a feedback signal. When multiplied by the wheel rolling radius, the average non-driven wheel speed correlates closely with the vehicle speed.

Due to the delay associated with the CAN, the wheel speed measurement is not received by the powertrain controller for roughly 30 ms. This delay can vary somewhat depending upon the wheel speed. A typical control loop time step would be about 10 ms. The delay associated with the wheel speed measurement constrains the value of $K_w$ that could potentially result in instability and therefor limits the rate at which the algorithm can reduce any errors. It is preferable to compare the wheel speed measurement with an estimate that corresponds as closely as possible to the time that the wheel speed measurement is taken. The above algorithm can be modified to accomplish this result by expanding the number of values in the state vector. Instead of a single value $\hat{\omega}_w$ representing the current estimate of wheel speed, the expanded state vector includes four values $\hat{\omega}_{w1}$, $\hat{\omega}_{w2}$, $\hat{\omega}_{w3}$, and $\hat{\omega}_{w4}$ representing the wheel speed at the current time, one time step ago, two time steps ago, and three time steps ago, respectively. Then, the measured value is compared to the value from three time steps ago, $\hat{\omega}_{w4}$. With this modification, the state equation becomes:

$$\begin{bmatrix} \hat{\theta}_{s,n+1} \\ \hat{V}_{x,n+1} \\ \hat{\omega}_{w0,n+1} \\ \hat{\omega}_{w1,n+1} \\ \hat{\omega}_{w2,n+1} \\ \hat{\omega}_{w3,n+1} \end{bmatrix} = \begin{bmatrix} a_{11} & a_{12} & a_{13} & 0 & 0 & -K_\theta \\ a_{21} & a_{22} & a_{23} & 0 & 0 & -K_V \\ a_{31} & a_{32} & a_{33} & 0 & 0 & -K_{w1} \\ 0 & 0 & 1 & 0 & 0 & -K_{w2} \\ 0 & 0 & 0 & 1 & 0 & -K_{w3} \\ 0 & 0 & 0 & 0 & 1 & -K_{w4} \end{bmatrix} \begin{bmatrix} \hat{\theta}_{s,n} \\ \hat{V}_{x,n} \\ \hat{\omega}_{w0,n} \\ \hat{\omega}_{w1,n} \\ \hat{\omega}_{w2,n} \\ \hat{\omega}_{w3,n} \end{bmatrix} + \begin{bmatrix} b_{11} & b_{12} & b_{13} & K_\theta \\ b_{21} & b_{22} & b_{23} & K_V \\ b_{31} & b_{32} & b_{33} & K_{w1} \\ 0 & 0 & 0 & K_{w2} \\ 0 & 0 & 0 & K_{w3} \\ 0 & 0 & 0 & K_{w4} \end{bmatrix} \begin{bmatrix} \omega_o \\ \tau_w \\ F_b \\ \omega_w \end{bmatrix}.$$

An additional complication arises from the fact that some types of speed sensors are not accurate at very low speeds. To account for this issue, the algorithm can be modified to utilize another sensor at these low speeds. For example an accelerometer sensor may be used to adjust the estimate of shaft twist according to the formula:

$$\hat{\theta}_{s,n+1} = K_{mix} * \hat{\theta}_{s,n+1} + (1-K_{mix}) * K_a * a_x$$

where $a_x$ is the accelerometer reading, $K_a$ is a calabratable constant, and $K_{mix}$ is a value between zero and one that indicates the weight that should be given to each method. When the vehicle speed is very low, $K_{mix}$ is set to zero such that shaft twist is entirely determined by the accelerometer reading. As the vehicle speed increases and the readings of the speed sensors become reliable, the values in the state vector stabilize, even if their initial values were erroneous.

Then, $K_{mix}$ is gradually increased to one over a number of control steps to avoid any discontinuity during the transition between methods.

Figure 5:
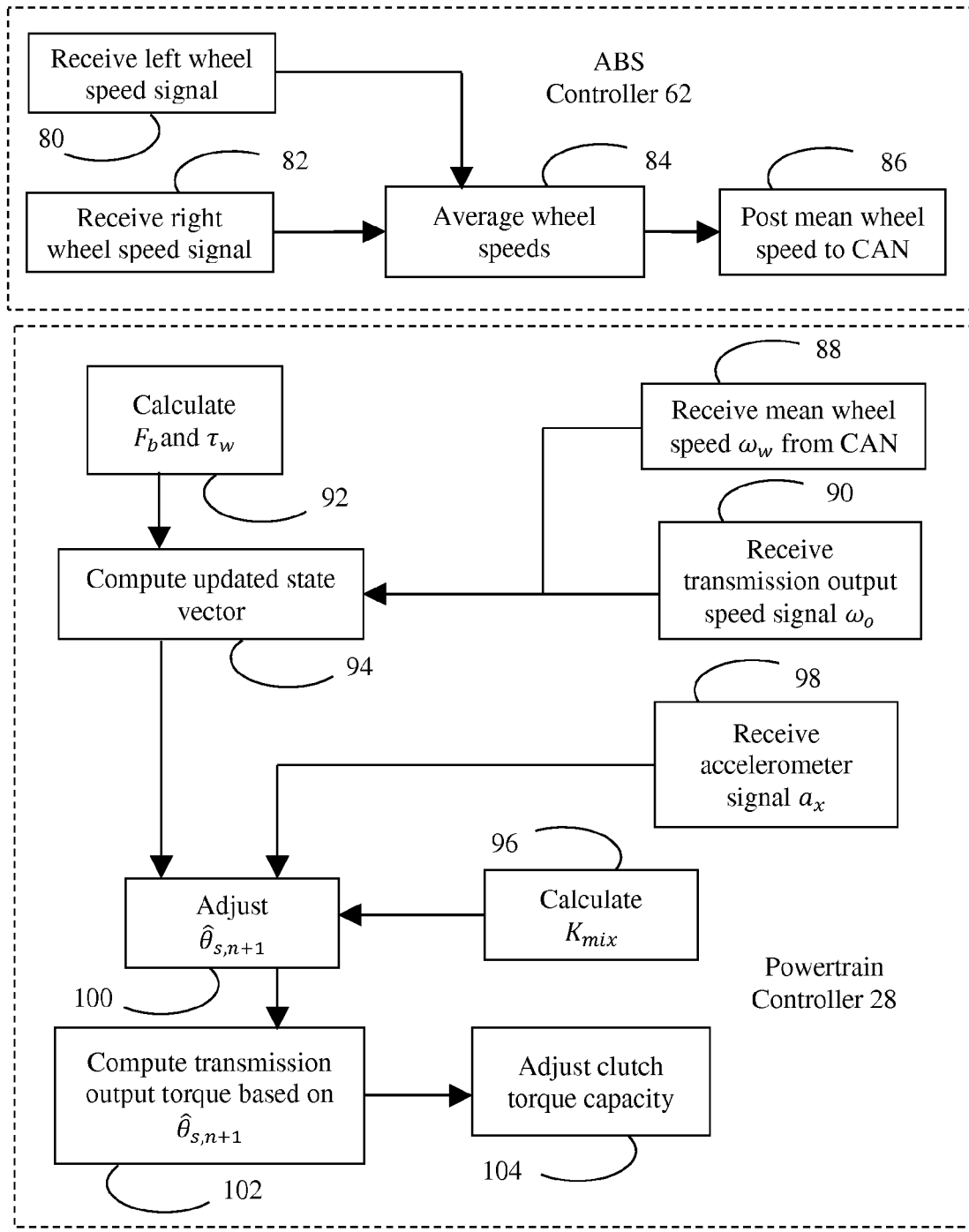
FIG. 5 is a flow chart illustrating a method of controlling a clutch, such as one of the clutches in FIG. 2, based on powertrain sensors as shown in FIG. 1 and wheel speed sensors as shown in FIG. 3 communicated through the controller network of FIG. 4.

FIG. 5 is a flow chart illustrating the steps taken by each controller at each time step. The ABS controller receives wheel speed signals from the left and right driven wheels at 80 and 82. The ABS controller computes an average wheel speed at 84 and posts that value to the CAN at 86 for use by other controllers such as the powertrain controller. At 88, the powertrain controller receives the average wheel speed signal from the CAN. Equivalently, the ABS controller could post both the left and right driven wheel speeds and the powertrain controller could do the averaging. The powertrain controller also receives the transmission output speed at 90. The powertrain controller calculates the other torques on the driven wheels and the other forces on the vehicle at 92. At 94, the state vector for the current time step is computed based on the state vector for the previous time step and the values received or computed at 88, 90, and 92. At 96, the powertrain controller calculates $K_{mix}$ as described above. The powertrain controller reads the accelerometer at 98 and adjusts the shaft twist estimate accordingly based on $K_{mix}$ at 100. At 102, the controller computes the transmission output torque based on the adjusted shaft twist estimate. Finally, the controller adjusts the torque capacity of one or more clutches based on the transmission output torque at 104.

If the tires of the vehicle are replaced with smaller diameter tires, then a given transmission wheel torque will result in a greater tractive force and, consequently, greater vehicle acceleration. During the early phase of a vehicle launch, when the method relies predominantly upon an accelerometer signal, the method will over-estimate the transmission output torque. Consequently, the controller will adjust clutch torque capacity to deliver an actual transmission output torque less than the target transmission output torque. As $K_{mix}$ is adjusted and the method relies upon wheel speed signals for feedback, the tire rolling radius will have much less impact and the estimate of transmission output torque will accurately reflect the actual transmission output torque. Therefore, the controller will then adjust clutch torque capacity to deliver an actual transmission output torque equal to the target transmission torque. During vehicle launch the target transmission output torque may be computed as a function of transmission output speed and pedal position. Thus for a particular pedal position, use of smaller tires will result in reduced actual transmission output torque during the early phase of a launch, when the method uses an accelerometer signal, and nominal transmission output torque during the later phase of a launch, when the method uses wheel speed signals.

While exemplary embodiments are described above, it is not intended that these embodiments describe all possible forms encompassed by the claims. For example, although certain parameters are described as calibratable constants, adaptive methods to dynamically adjust these parameters during operation are possible. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A controller comprising:
communication channels for receiving data from a plurality of sensors and for sending a command to adjust a torque capacity of a transmission clutch; and
a processor programmed to repeatedly:
compute an input vector comprising a plurality of input values based on the data from the sensors,
compute a current step state vector comprising a plurality of state values as a function of the input vector and a previous step state vector, the plurality of state values including a first state value that varies in proportion to transmission output torque, and
adjust the torque capacity of the clutch, based on the first state value, to deliver a target transmission output torque.

2. The controller of claim 1 wherein the first state value is an estimate of present shaft twist angle.

3. The controller of claim 2 wherein the plurality of state values further includes an estimate of present wheel speed.

4. The controller of claim 3 wherein the plurality of state values further includes an estimate of wheel speed at a time in the past.

5. The controller of claim 3 wherein the plurality of state values further includes an estimate of present vehicle speed.

6. The controller of claim 1 wherein the plurality of input values includes a transmission output speed measurement.

7. The controller of claim 6 wherein the plurality of input values further includes a wheel speed measurement.

8. The controller of claim 7 wherein the plurality of input values further includes a vehicle acceleration measurement.

9. A method of controlling a transmission clutch comprising, at regular intervals:
computing an input vector comprising a plurality of input values based on a plurality of measurements;
computing a current step state vector comprising a plurality of state values as a function of the input vector and a previous step state vector; and
adjusting a torque capacity of the transmission clutch based on one of the state values that is proportional to transmission output torque.

10. The method of claim 9 wherein the plurality of input values includes a transmission output speed measurement.

11. The method of claim 10 wherein the plurality of input values further includes a wheel speed measurement.

12. The method of claim 9 wherein the state value upon which the torque capacity of the transmission clutch is adjusted is an estimate of present shaft twist angle.

13. The method of claim 12 further comprising adjusting the estimate of present shaft twist angle based on a vehicle acceleration measurement.

14. The method of claim 12 wherein the plurality of state values further includes an estimate of present wheel speed.

15. The method of claim 14 wherein the plurality of state values further includes an estimate of wheel speed at a time in the past.

16. The method of claim 14 wherein the plurality of state values further includes an estimate of present vehicle speed.

17. The method of claim 9 wherein the transmission clutch is a launch clutch.

* * * * *